United States Patent [19]
Lewis

[11] 4,182,373
[45] Jan. 8, 1980

[54] ROTARY BALL VALVE

[76] Inventor: Kenneth Lewis, 11201 S. Garfield, South Gate, Calif. 90280

[21] Appl. No.: 878,409

[22] Filed: Feb. 16, 1978

[51] Int. Cl.$^2$ .................... F16K 11/00; F16K 25/00
[52] U.S. Cl. ............................... 137/625.44; 251/298
[58] Field of Search ............. 137/625.47, 625.44; 251/298

[56] References Cited

U.S. PATENT DOCUMENTS

| 1,171,189 | 2/1916 | Grandi | 251/298 |
| 2,694,414 | 11/1954 | Seyferth | 251/298 X |
| 3,538,953 | 11/1970 | Berger | 137/625.44 X |

FOREIGN PATENT DOCUMENTS 476466 12/1975 Australia ............................ 137/625.44

*Primary Examiner*—Arnold Rosenthal
*Attorney, Agent, or Firm*—Christie, Parker & Hale

[57] ABSTRACT

A rotary valve in which a chamber has one or more circular ports opening into the chamber. A ball of flexible resilient material is journaled on the offset end of a bell crank shaft extending into the chamber. Rotation of the shaft rotates the axis of the ball around the inside of the chamber, moving the ball from port to port. When engaged with the port, the ball expands into the opening sealing off the port.

8 Claims, 5 Drawing Figures

ROTARY BALL VALVE

FIELD OF THE INVENTION

This invention relates to rotary ball valves, particularly to a multiple port low-pressure rotary valve.

BACKGROUND OF THE INVENTION

To help reduce the cost of installation of home swimming pools and whirlpool spas, the use of plastic plumbing has become widely adopted. This in turn has given rise to the need for valves constructed of plastic materials, particularly valves which can act both as shutoff valves and as valves for directing water through various outlets from the pump. Three-way and four-way ball-type valves have heretofore been provided made of plastic materials. However, such known valves have required machining to close tolerances, and inner seals to prevent leakage. Moreover, known ball valves have provided restrictive flow passages through the valve.

SUMMARY OF THE INVENTION

The present invention provides an improved low-pressure valve made of plastic materials which can be used as a shutoff valve or a two-, three-, or four-way valve. The valve of the present invention requires substantially no machining in its manufacture, being constructed of molded plastic parts. The valve is relatively inexpensive and can be easily disassembled for cleaning without disconnecting or removing it from the external plumbing connections. Though the valve is compact in size, it provides full flow without restriction.

These and other advantages of the present invention are achieved by providing a rotary valve comprising a housing having an enclosed cylindrical chamber. A plurality of circular ports communicating with external pipes open into the chamber. A ball of larger diameter than the ports is journaled on an offset crank for rotation of the ball around the outer circumference of the cylindrical chamber. Thus the ball can be moved from port to port to selectively seal off any one of the ports into the chamber. The ball is made of a resilient material which is compressed against the cylindrical wall of the chamber and expands into the port openings to close off selected ones of the port openings when rotated into position.

DESCRIPTION OF THE DRAWINGS

For a more complete understanding of the invention reference should be made to the accompanying drawings, wherein.

DETAILED DESCRIPTION

Figure 1:
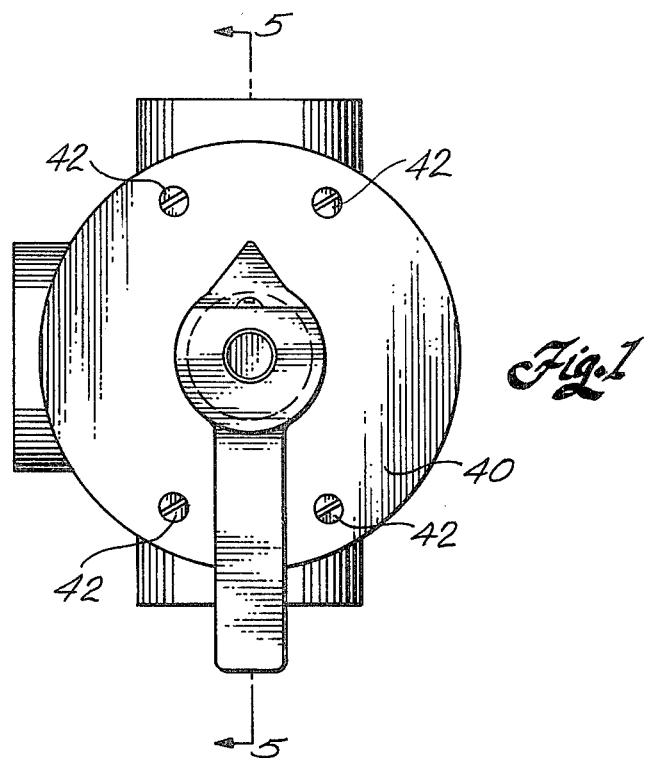
FIG. 1 is an end view of the valve.

Referring to the drawings in detail, the numeral 10 indicates generally the housing of the valve. The housing is generally cup-shaped forming an interior chamber 14 closed at one end by an integral end wall 12. The cup-shaped housing 10 may be molded from a suitable plastic material, such as polyvinyl chloride, or the like, which has strength and dimensional stability. The outer wall of the housing 10 is generally cylindrical in shape, as indicated at 16, but with one or more flat sections, as indicated at 18, 20 and 22. Each of these flat sections includes an opening or port, as indicated at 24, 26, and 28, respectively. A cylindrical collar is mounted on each of the flat portions in axial alignment with the respective ports, as indicated at 30, 32, and 34, respectively. The collars may be cemented to the housing or integrally molded with the housing and provide female couplers for joining PVC pipe to the valve, as indicated at 36. The chamber 14 is closed off by a removable end plate 40 which is secured to the housing by a plurality of screws 42. A rubber seal 44 is provided in the edge of the housing to form a seal between the housing and the end plate 40.

The end plate 40 has an integrally molded collar 46 having an opening therethrough in which is press-fitted a metal bushing 48. The bushing 48 acts as a bearing in which is journaled a shaft 50 extending into the chamber 14. An O-ring seal 52 in the bushing prevents leakage around the shaft. A handle 54 is secured to the outer end of the shaft 50 for manually turning the shaft. The inner end of the shaft 50 is provided with a bell crank 56. The bell crank includes a radial shaft portion 58 which is secured to the inner end of the shaft 50 by inserting the radial portion through the hole in the shaft 50 and welding, brazing, or otherwise securing the radial portion in place. The bell crank 56 includes a parallel shaft portion 60 which extends parallel to but is offset from the axis of the shaft 50. The outer end of the parallel shaft portion 60 has a roller 62 which is in rolling contact with the outer cylindrical surface of a disk 64 secured to the inner surface of the end wall 12 by a screw 66. The disk 64, however, may be integrally molded with the end wall 12, if desired. The outer cylindrical surface of the disk 64 is coaxial with the shaft 50 so that, as the shaft 50 is rotated, the roller 62 guides the outer end of the parallel shaft 60 in a circular path which is centered on the axis of rotation of the shaft 50.

Figure 3:
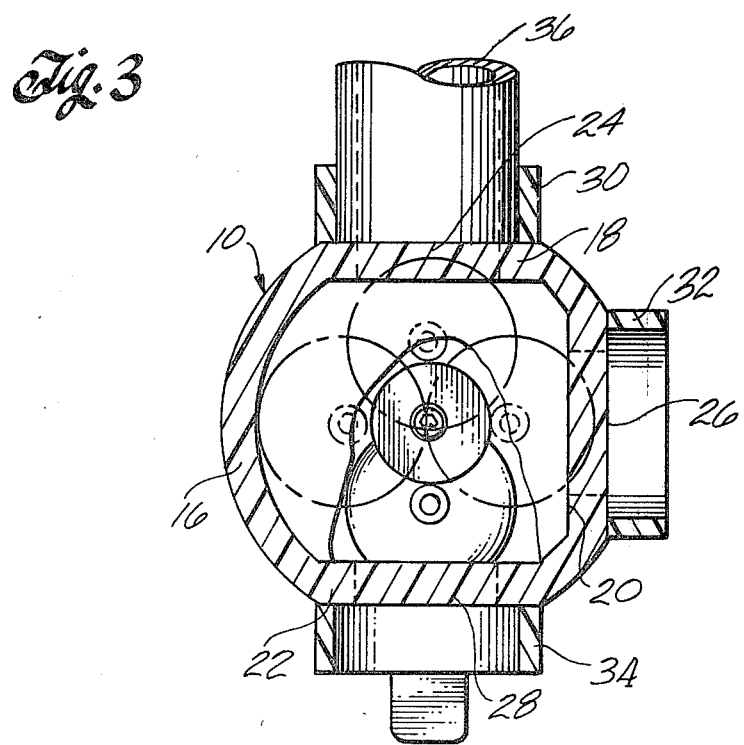
FIG. 3 is a sectional view taken substantially on the line 3—3 of FIG. 2.
Figure 2:
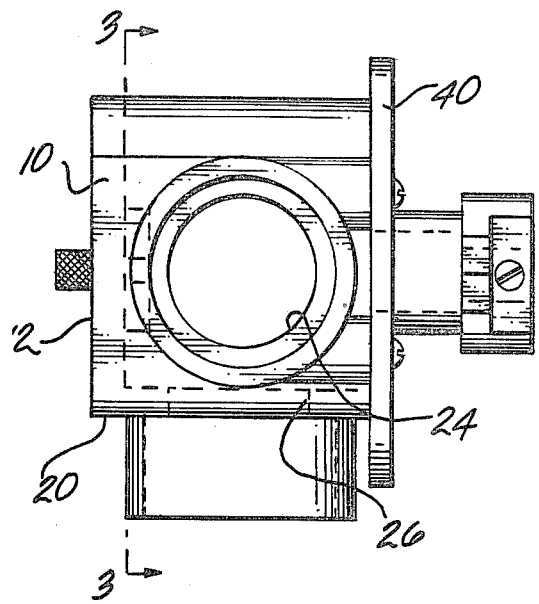
FIG. 2 is a top view of the valve.
Figure 4:
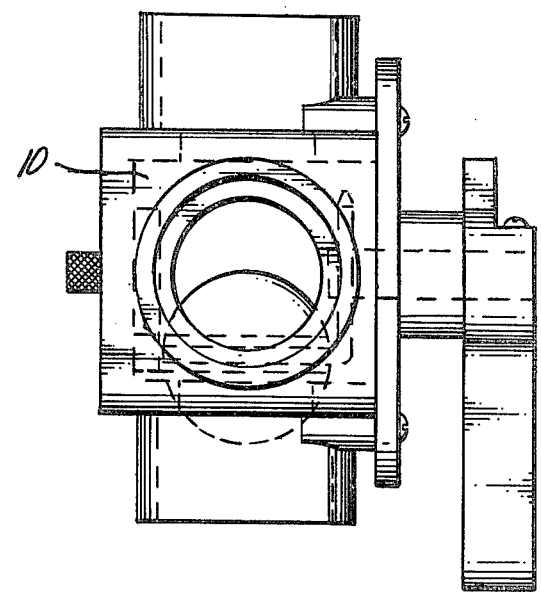
FIG. 4 is a side view of the valve.
Figure 5:
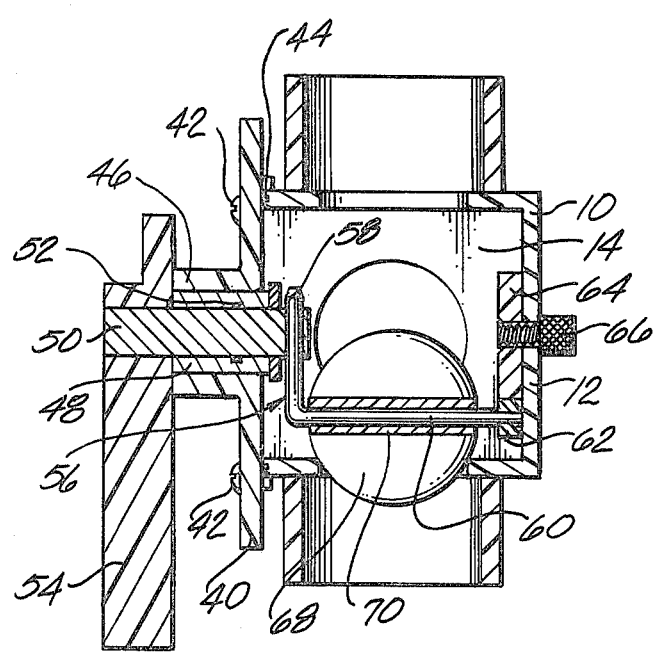
FIG. 5 is a sectional view taken substantially on the line 5—5 of FIG. 1.

The ball 68 having a central bore in which is positioned a bushing 70 is journaled for rotation on the parallel portion 60 of the bell crank 56. The bushing 70 may be made of sintered bronze or other suitable bearing material which is integrally molded with the ball 68. The ball 68 is made of a flexible resilient material, such as natural or synthetic rubber, or a polyurethane foam material. As seen in FIG. 3, as the shaft 50 is rotated by the handle 54, the ball 68 rolls about the interior of the housing chamber 14.

The radius of the ball 68 plus the offset radius of the bell crank is slightly greater than the inner radius of the cylindrical wall of the housing. When the ball is moved to the flat portions of the housing, it is compressed and squeezed between the inner surface of the chamber 14 and the supporting parallel shaft portion 60 of the ball crank 56. As the ball moves across the port in one of the flat portions of the housing, the ball expands into the opening, forming a seal with the circular edge or lip of the port, thereby closing off the port to flow of water between the chamber 14 and the external pipe. Rotation of the handle 54 moves the ball from one port to the next, or moves the ball to a position in which it is not engaged with any of the ports. Thus it will be seen that any one of the ports can be selectively closed off or all of the ports can be left open by positioning the handle 54 in any one of four positions spaced at 90 degrees with respect to each other.

The valve handle may be provided with an indexing mechanism (not shown) to hold the handle in any one of the selected positions. However, it has been found that the friction of the ball against the inner surface of the housing is sufficient to hold the ball in any selected position. Also when the ball is seated in one of the ports, fluid pressure acting on the ball is parallel to the plane defined by the axis of rotation of the shaft 50 and axis of the parallel shaft portion 60, so that the fluid produces no net turning moment about the axis of rotation of the shaft 50.

From the above description it will be seen that the valve provides means of directing flow between the central port 26 selectively to either the ports 24 or 28, or the port 26 may be shut off to allow flow only between ports 24 and 28. Also all ports may be open to allow the flow to divide between two pipes from the third pipe. While three ports have been shown in the preferred embodiment, the invention is not limited to a valve having a particular number of ports. An On/Off valve having a single port, for example, may be provided to provide a simple On/Off or shutoff valve. The valve is easily dismantled for cleaning without disturbing the plumbing connections simply by removing the end plate 40. The housing and/or the end plate may be made of clear plastic material to permit visual inspection to determine if debris, such as leaves, twigs, or the like, have become lodged in the valve tending to restrict flow. One of the advantages of the valve is that the individual ports have the same diameter as the ID of the attached pipes. With no constriction in the flow path, the valve provides maximum flow through the associated pipes. Because the ball is made of a flexible resilient material, it forms a self-sealing action with the lip of the respective ports, thus eliminating the need for any inner seals at the ports, as is required in conventional ball-type valves.

What is claimed is:

1. A rotary valve comprising a housing having an enclosed chamber, a plurality of circular ports opening into said chamber, the ports being spaced circumferentially around the interior of the chamber with the centers of the circular ports lying in a common plane, a rotary member extending into the chamber with the axis of rotation extending perpendicular to said plane and equally spaced from the centers of each of said circular ports, the rotary member including an axle portion within the chamber extending parallel to but offset from the axis of rotation of the member, a ball made of a resilient compressible material journaled on the axle portion, the ball having a diameter substantially smaller than any of the interior dimensions of the chamber but slightly larger in diameter than the circular ports, rotation of the rotating member moving the ball selectively into seating engagement with any one of said ports to close off the particular port, the ball when seated in one of the ports being held in compression against the circular edge of the port by the rotary member to seal the port against fluid flow out of the port into the chamber, the plane defined by the axis of rotation of the rotary member and the offset parallel axle being aligned with and passing through the center of a port when the ball is seated in the port, whereby fluid pressure on the ball does not produce a turning moment on the rotary member.

2. Apparatus of claim 1 wherein the rotating member includes a handle portion extending outside the housing for rotating the position of the ball within the chamber.

3. Apparatus of claim 1 wherein the chamber has a substantially cylindrical inner surface coaxial with the rotary member.

4. Apparatus of claim 3 wherein the chamber has a plurality of flat areas on the cylindrical inner surface, the ports being located in said flat areas.

5. Apparatus of claim 4 wherein the minimum spacing between the edge of each port and the axle is substantially less than the radius of the ball, whereby the resilient ball expands into seating engagement with a port when positioned at the center of the port.

6. Apparatus of claim 1 further including a circular disk in the chamber secured to the housing, the center of the disk being coaxial with the rotating member, and roller means on the axle in rolling contact with the circular perimeter of the disk.

7. A rotary ball valve comprising a housing having an enclosed chamber formed by a pair of spaced end walls and a continuous side wall extending between the end walls, the side wall having at least one flat inner surface with a circular opening therein, a shaft extending through and rotatably supported by one of the end walls and having a bell crank at one end within the chamber, the bell crank providing an axle extending parallel to but offset from the axis of rotation of the shaft, a ball journaled on the axle made of resilient compressible material, the ball being movable by rotation of the shaft and bell crank into alignment with said circular opening, the radial thickness of the ball plus the radial offset of the bell crank being greater than the radial distance from the axis of the shaft to the edge of the circular opening whereby the surface of the ball is compressed as the ball moves over the edge of the opening and expands into the circular opening to hold the ball in compressed sealing engagement with the margin of the opening, the plane defined by the axis of rotation of the shaft and the parallel offset axle passing through the center of the opening when the ball is seated in the opening.

8. Apparatus of claim 7 wherein the ball is in rolling contact with said continuous side wall throughout a complete revolution of the shaft.

* * * * *